April 12, 1966 D. R. VIRZI 3,245,577
RESIN-COATED TIN PLATE CONTAINER
Filed Dec. 12, 1962

INVENTOR.
DONALD ROBERT VIRZI
BY Robert P. Auber
George W. Reiber
ATTORNEYS

United States Patent Office 3,245,577
Patented Apr. 12, 1966

3,245,577
RESIN-COATED TIN PLATE CONTAINER
Donald Robert Virzi, Oak Park, Ill., assignor to American Can Company, New York, N.Y., a corporation of New Jersey
Filed Dec. 12, 1962, Ser. No. 244,085
5 Claims. (Cl. 220—64)

This invention relates to coated ferrous metal sheet having a synthetic resin laminated thereto by improved adhesion means. More particularly, the invention pertains to tin plate sheet having a thin deposit of chromium thereon to promote the adhesion of a synthetic resin coating to the sheet.

Many of the metal cans produced today, because of the corrosivity of the product packed therein, require an inert and continuous barrier between the metal of the can and the product. Although usually adequate, the adhesion of many of these barrier coatings to the flow-brightened tin surface in ordinary metal cans is capable of improvement. One method used to effect this improvement has been to apply a base or prime coat to the bare metal and apply the desired barrier coating thereon. Obviously, such a practice increases the expense of the finished can, both as to materials and its manufacture. On the other hand, even in cases where the coatings exhibit sufficient adhesion to the bare metal to permit their use without a prime coating, it is desirable to improve the degree of coating adhesion, thereby increasing shelf life and the abuse resistance of the can during manufacturing, packing and shipping.

It is therefore an object of the present invention to provide a metal can having a resin, barrier-coating adhered directly and firmly to all or any portion of its interior metal surface.

Another object is to provide a method of improving the adhesion of resin coatings to tin plate.

Still another object is to provide an inexpensive coated tin plate which is adaptable to production by current commercial equipment.

A further object is to provide an intermediate layer between flow-brightened tin plate sheet and a resin barrier coating which will increase the adhesion of the resin coating to the sheet.

Numerous other objects and advantages of the invention will be apparent as it is better understood from the following description, which, taken in connection with the accompanying drawings, discloses a preferred embodiment thereof.

The above objects of the present invention are obtained by providing a thin coating of chromium over all or part of the tin surface of tin plate; and thereafter adhering a resin layer to the chromium surface. The resin may be applied after the metal sheet is fabricated into a metal can, or the resin coating may be applied directly to the flat surface of the chromium coated tin plate.

Figure 1:
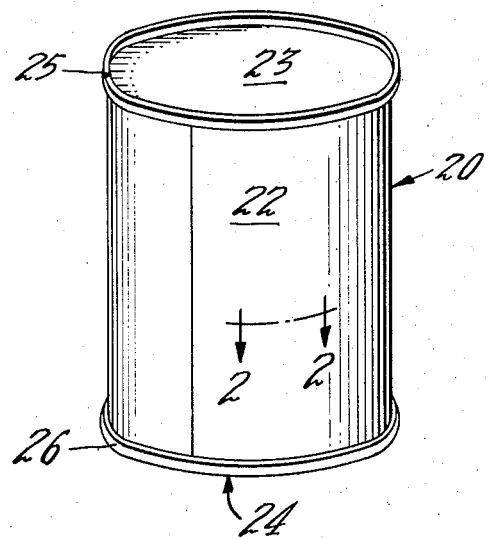
Figure 2:
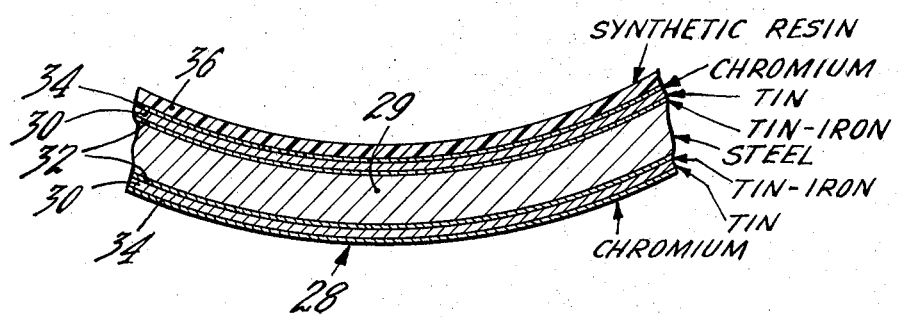

Referring to the drawings:
FIG. 1 is a perspective view of a metal container made from the material of this invention.
FIG. 2 is an enlarged fragmentary sectional view taken substantially along line 2—2 of FIG. 1.

As a preferred or exemplary embodiment of the present invention, FIG. 1 illustrates a metal container, generally designated 20, having a body 22, and upper and lower ends 23, 24 thereon respectively, made integral with the body 22 by any suitable means such as upper and lower double seams 25, 26 respectively.

The material, from which the container 20 is made (FIG. 2), is a multilayer metal sheet 28 of basis steel 29 having thereover a layer of tin 30 and a tin-iron alloy layer 32 between the tin 30 and the steel sheet 28. This alloy layer 32 is formed during the melting or flow-brightening of the tin layer 30, subsequent to the deposition of tin, by a procedure that will be described more fully hereinafter.

In some cases it may be desirable to eliminate the flow-brightening operation, thus the alloy layer 32 would not be formed.

Immediately adjacent to the tin layer 30 is a thin chromium deposit 34. It is desired that the chromium layer 34 be present on at least that side of the sheet 28 which forms the interior surface of the container 20. However, since it is not known at the time of chromium coating which side of the sheet 28 will be the interior surface of the container 20, chromium will generally be present upon both sides of the sheet.

The chromium 34 is an extremely thin layer. This thin coating of chromium does not appreciably increase the sheet's corrosion resistance, but rather promotes the adhesion of an organic top coating to the sheet 28.

Covering the chromium 34, at least on the interior surface of the can 20, is a coating of synthetic resin 36, which is applied to the chromium surface by means which will be described more fully hereinafter. The synthetic resin 36 may be any of a number of types, depending upon the product to be packaged. Among such resins that may be utilized are phenolics, epoxies, organosols, solution-vinyls, etc.

Although not wishing to be bound by any particular theory as to the mechanism resulting in greater adhesion of the synthetic resin 36 to the chromium coated tin, rather than to the bare bright tin, it is thought that some form of chemical bond may be formed by the interaction of the tin, chromium, and resin and possibly some mechanical bonding. It is known that chromates, i.e. chemical conversion compounds containing $Cr_2O_4$ or $Cr_2O_7$ ions, when reacted with a metal surface, will usually render such surface more receptive to the application of adherent organic coatings.

However, this generally is not the case where the surface consists of chromium metal. A metallic chromium surface is quite inert and has a low coefficient of friction, thus theoretically providing a poor base for adhering resin coatings.

From the foregoing, it may thus be theorized that the metallic chromium deposit, which is more adherent to the bright tin substrate than would be a chromate coating, reacts with the tin substrate and resin coating to form a chromium compound having greater adhesive properties for resin than metallic chromium. In this way only an extremely small amount of chromium is necessary to obtain unexpectedly excellent adhesion.

In addition, the necessity for a continuous chromium coating apparently is not necessary. Conversely, it may be advantageous to have a non-continuous layer of chromium, as would probably occur from the deposition of no more than 3500 micrograms per square foot, but at least 25 micrograms per square foot, in order to promote the reaction between resin, substrate tin and chromium.

The coated metal of this invention is produced by providing low carbon ferrous metal sheet, preferably in coil form, which is electrolytically cleaned in a hot alkaline cleaning solution by means well known to those skilled in the art. Thereafter the strip is pickled in an acid solution, such as 5% sulfuric acid, in order to remove any oxides present on the metal surface.

Once the surface contamination has been removed by cleaning and pickling, the strip is rinsed and then immersed in a tin plating bath. Either an alkaline or acid tin plating bath may be used, but the acid type is considered more desirable due to the higher current densities that may be used, and consequently the shorter plating cycles that may be attained.

One of numerous acid tin plating baths that may be used has a composition as follows:

| | Oz. per gal. |
|---|---|
| Stannous sulfate | 13 |
| Sulfuric acid | 4 |
| Tartaric acid | 4 |
| Animal glue | 0.4 to 0.8 |
| Cresol | 0.8 |
| B-naphthol | 0.13 |

The bath is operated at room temperature and pure tin anodes are used in order to minimize the formation of sludge during plating.

Using a current density of from 10 to 400 amperes per square foot (A.S.F.), dependent upon the degree of agitation in the bath, a coating of tin from $6 \times 10^{-6}$ to $90 \times 10^{-6}$ inch in thickness is deposited upon the steel basis metal. Preferably the tin deposit will have a thickness of from $15 \times 10^{-6}$ to $60 \times 10^{-6}$ inch.

It is also possible to deposit the tin coating by such techniques as vacuum or gaseous deposition, although the hereinbefore mentioned electrolytic method is preferred.

Once the tin coating has been deposited upon the steel strip, the next operation in the process is to flow-brighten the coating and thereby produce a bright tin surface. During flow-brightening an alloy layer of tin and iron is formed, as the tin is melted to produce the bright tin on the surface of the strip.

As is well known in the art, either resistance or induction heating may be used to heat the tin plated strip. By either heating method the coated metal is heated to a temperature above the melting point of tin, 450° F., but generally no higher than 550° F. The temperature of the strip is maintained above 450° F. for a period from 0.01 to 1 second, and preferably 0.25 second, and then cooled to solidify the tin. This operation produces a thin Sn–Fe alloy layer between the steel basis metal and the concurrently produced bright tin-surfaced, outer coating.

Subsequent to the flow-brightening operation the strip is immersed in an aqueous chromium plating bath. Although many types of chromium plating baths may be utilized in carrying out this invention, a bath having the following composition was used:

| | Oz. per gal. |
|---|---|
| Chromic acid | 33 |
| Sulfuric acid | 0.33 |

The flow-brightened tin plate was immersed in the above solution, whose temperature was maintained at 105° F. A direct current at a density of 90 amperes per square foot was then passed for approximately 0.1 second. During plating, solution agittion was kept at a minimum. A total current of 9 ampere-seconds per square foot was thus passed, resulting in a chromium deposit averaging about 800 micrograms per square foot comparable to a chromium thickness of approximately $54 \times 10^{-9}$ inch.

Insoluble anodes are used in the plating operation. Although pure lead may be used, alloy anodes having 93% lead plus 7% tin or 92% lead plus 8% antimony are preferred. Bath temperature will generally lie between 90° and 130° F.

In carrying out the chromium deposition it is to be understood that considerable latitude may be used in the operating conditions of the plating bath, depending principally upon the degree of agitation of the solution. With an increase in agitation the extent of cathode polarization is, of course, decreased, thus permitting higher current densities. In high-speed strip plating, current densities may vary from as low as 90 A.S.F. to as high as 900 A.S.F. Since such a variance in current density is present, a more exact measurement of deposition is the current passed per square foot in a given period of time.

For the purposes of this invention, the current passed during chromium plating will vary from 0.28 to 39 ampere-seconds per square foot, giving a chromium deposit weight from 25 to 3500 micrograms per square foot. This is comparable to a chromium thickness of from $1.5 \times 10^{-9}$ to $210 \times 10^{-9}$ inch. The preferred chromium thickness ranges from $6 \times 10^{-9}$ to $60 \times 10^{-9}$ inch, which may be deposited with a current from 1.12 to 11.2 ampere-seconds per square foot, respectively. An optimum thickness for the chromium layer is about $30 \times 10^{-9}$ inch.

Although electrodeposition of the chromium is preferred, vacuum deposition, gaseous deposition, or immersion plating may be used for depositing the thin metallic chromium coating.

After chromium plating, the strip is dried and a resin coating may be applied directly to the surface of the strip by any conventional coating procedure, such as spraying or roller coating, and thereafter baked at elevated temperature. The metal sheet is thereby provided with a highly adherent, flexible, inert, mar-resistant resinous outer protective coating. If the synthetic resin is applied to flat sheet metal, i.e. individual sheets or continuous strip, the sheet metal may thereafter be readily formed into cans or can parts by any of the usual canmaking procedures, with the resin coating on its interior surface.

The resin coating may also be applied to the chromium coated metal surface subsequent to fabrication of the metal sheet into can bodies. In such cases the resin is generally sprayed onto the interior surface of the can body utilizing conventional can body spraying equipment.

As was mentioned hereinbefore, the synthetic resin may be any of a number of types, depending upon the product to be packaged. Among such resins that may be used are phenolics, epoxies, organosols, vinyls, etc.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A material for use in the manufacture of metal containers, comprising: a basis metal of steel sheet; a coating of electrolytically deposited tin over said sheet, said tin having a thickness from $6 \times 10^{-6}$ to $90 \times 10^{-6}$ inch; a coating of chromium over said tin, said chromium having a thickness from $1.5 \times 10^{-9}$ to $210 \times 10^{-9}$ inch; and a coating comprising a synthetic resin over said chromium, said chromium and resin coating covering at least one major surface of said sheet.

2. The material of claim 1 wherein said chromium coating has a thickness from $6 \times 10^{-9}$ to $60 \times 10^{-9}$ inch.

3. A ferrous sheet metal container comprising: a body member having an end member secured thereto; at least one of said members having on the interior surface thereof a composite coating; said composite coating comprising an inner layer of electrolytically deposited tin, an intermediate layer of deposited chromium having a thickness from $1.5 \times 10^{-9}$ inch to $210 \times 10^{-9}$ inch, and top layer comprising a synthetic resin.

4. The container of claim 3 wherein said tin coating has a thickness from $6 \times 10^{-6}$ to $90 \times 10^{-6}$ inch.

5. The container of claim 4 wherein said chromium coating has a thickness from $6 \times 10^{-9}$ to $60 \times 10^{-9}$ inch.

References Cited by the Examiner

UNITED STATES PATENTS

| 3,017,696 | 1/1962 | Vaaler | 29—195 |
| 3,108,709 | 10/1963 | Bosmajian | 220—64 |
| 3,113,845 | 12/1963 | Uchida et al. | 29—195 |
| 3,134,682 | 5/1964 | Vogel et al. | 220—64 |

THERON E. CONDON, *Primary Examiner.*

G. T. HALL, *Assistant Examiner.*